United States Patent [19]

Dixit et al.

[11] Patent Number: 5,487,906
[45] Date of Patent: Jan. 30, 1996

[54] METHOD OF FORMING STABLE AQUEOUS SOLUTIONS OF STANNOUS COMPOUNDS

[75] Inventors: Nagaraj Dixit, Plainsboro; Gary Durga, Edison; Michael R. Burke, Somerset; Michael Prencipe, West Windsor; Suryakant Patel, Bridgewater, all of N.J.

[73] Assignee: Colgate-Palmolive Company, Piscataway, N.J.

[21] Appl. No.: 356,804

[22] Filed: Dec. 15, 1994

[51] Int. Cl.⁶ .............................. A61K 33/16; A61K 7/18
[52] U.S. Cl. .................. 424/673; 424/52; 424/49
[58] Field of Search ................... 424/49–58, 673

[56] References Cited

U.S. PATENT DOCUMENTS

| | | | |
|---|---|---|---|
| 2,839,448 | 6/1958 | Hager et al. | 167/93 |
| 3,105,013 | 9/1963 | Saul et al. | 167/93 |
| 3,282,792 | 11/1966 | Fiscella | 167/93 |
| 3,337,412 | 8/1967 | Elbreder | 167/93 |
| 4,011,309 | 3/1977 | Lutz | 424/49 |
| 4,267,167 | 5/1981 | Weitzman et al. | 424/52 |
| 4,418,057 | 11/1983 | Groat et al. | 424/151 |
| 4,533,544 | 8/1985 | Groat et al. | 424/52 |
| 5,094,842 | 3/1992 | Riley | 424/52 |
| 5,320,830 | 6/1994 | Lukacovic et al. | 424/52 |
| 5,320,831 | 6/1994 | Majeti et al. | 424/52 |

FOREIGN PATENT DOCUMENTS

| | | |
|---|---|---|
| 89136 | 9/1983 | European Pat. Off. . |
| 9207550 | 5/1992 | WIPO . |
| 9307850 | 4/1993 | WIPO . |
| 9307852 | 4/1993 | WIPO . |

*Primary Examiner*—Shep K. Rose
*Attorney, Agent, or Firm*—Paul Shapiro; Robert C. Sullivan

[57] ABSTRACT

A method for the preparation of an aqueous stable premix containing a stannous ion releasing compound useful in the manufacture of an aqueous oral care composition containing a stable stannous ion releasing compound which comprises first dissolving the stannous compound in an aqueous solution of critic acid or its alkali metal salt to prepare the aqueous premix to the vehicle of the oral care composition.

11 Claims, No Drawings

METHOD OF FORMING STABLE AQUEOUS SOLUTIONS OF STANNOUS COMPOUNDS

BACKGROUND OF THE INVENTION

1. Field of the Invention

This invention relates to a method of forming aqueous solutions containing stannous ion releasing compounds having increased stannous ion stability. The aqueous solutions prepared in accordance with the invention are particularly useful in the formation of aqueous toothpaste, aqueous mouthwash and aqueous gel compositions containing stable stannous compounds exhibiting improved antitartar and antiplaque activity.

2. The Prior Art

There have been many proposals in the prior art to incorporate stannous compounds such as stannous fluoride into oral health care products for the purpose of achieving particular clinical benefits such as caries prevention, plaque control and the reduction of gingivitis. Upon association with water or saliva, these stannous compounds release stannous ions which are active against oral bacteria and provide the desired benefits.

Oral care compositions which contain stannous ion releasing compounds such as stannous fluoride exhibit excellent clinical benefits, particularly in the reduction of gingivitis but have not been widely used in aqueous oral care compositions because of stability problems as the stannous ion is unstable and tends to react with other ingredients of the oral care composition to form insoluble inactive tin compounds, thereby reducing the effective amount of available stannous ion in the composition. Presently available commercial oral care compositions contain stannous fluoride in anhydrous gels because of the instability of stannous ion in aqueous environments. For example U.S. Pat. No. 4,418,057 and 4,533,544 disclose a stannous fluoride oral care composition formulated as a non-aqueous gel mixture including anhydrous glycerin and an hydroxyethyl cellulose gelling agent. Total exclusion of moisture from the gel is required to protect the stannous ion.

Copending patent application Ser. No. 350,309 filed Dec. 6, 1994 discloses an aqueous composition for oral care, containing a stannous compound such as stannous fluoride, and a combination of a water soluble pyrophosphate salt and an organic acid compound which are present in the composition in an amount sufficient to effectively stabilize the stannous ion concentration. The composition containing the stabilized stannous compound is found to exhibit improved antitartar(anticalculus), antiplaque and antigingivitis activity.

During the commercial manufacture of aqueous oral compositions such as toothpastes in accordance with the invention of the above-identified patent application, it is the practice to form a "premix" of the liquid and water soluble portions of the paste to facilitate semi-continuous production in the final product mixing tanks. In the manufacture of the aqueous oral composition, it has been found that the aqueous premix solution which is used does not have adequate stability after its preparation to avoid deterioration over the storage period required preparatory to its use in the commercial production of the oral composition, the stannous ion forming insoluble precipitates within 5–10 minutes of formation of the premix.

The present invention produces a premix solution which is stable as to its stannous ion content over extended periods of time and which may be sub-divided and used in the preparation of oral care compositions in which the stannous ion is effectively stabilized.

SUMMARY OF THE INVENTION

In accordance with the present invention, there is provided a method of forming a stable aqueous stannous compound premix having sufficient stability to enable its use without deterioration during the storage period required in the commercial manufacture of oral compositions such as toothpastes wherein the premix is prepared by the mixing together (a) a stannous ion releasing compound in an amount effective to operate as an antiplaque agent when subsequently combined with the other ingredients of the oral composition (b) citric acid or its alkali metal salt in an amount effective to stabilize the stannous ion in the premix and (c) the balance water, the pH of the premix being maintained between about 1.5 and about 7.0 and preferably between about 1.5 and 2.5.

The premix is prepared in accordance with the method of the present invention by following the sequence of dissolving the stannous ion releasing compound in an aqueous solution of citric acid or a water soluble alkali metal salt thereof.

The premix solution containing the stannous ion releasing compound will remain stable and will not deteriorate for a period of at least three hours. The premix can then be used in the formulation of oral care compositions exhibiting antiplaque and antigingivitis activity, the oral composition being effectively stabilized during storage under normal conditions against deterioration to levels below that required in the use of the composition for the prevention of dental plaque and gingivitis.

As will hereinafter be demonstrated, it is an essential and critical feature of the present invention that the aqueous solution in which the stannous ion releasing compound is first dissolved is an aqueous solution containing citric acid or its alkali metal salt.

DESCRIPTION OF THE PREFERRED EMBODIMENTS

The premix prepared in accordance with the method of the present invention will normally have three essential components. These components are (1) a stannous ion releasing compound (2) citric acid or its alkali metal salt and (3) the balance water.

Generally the amount of the stannous ion releasing compound present in the premix will range from about 2 to about 25% by weight of the premix and preferably about 3 to about 20% by weight.

The citric acid or the alkali metal salt thereof employed in the present invention will normally be present in the premix in an amount of from about 1.0 to about 15% by weight of the premix and preferably about 5 to about 10% by weight.

With respect to the finished product that is, the oral composition into which the premix is incorporated, the amount of the stannous compound present in the product will range from about 0.25 to about 3.0% by weight and the amount of citric acid or its alkali metal salt in the finished product will range from about 1 to about 5% by weight and preferably 2 to 4% by weight.

Water is a further component of the premix and the finished product. Concentrations of either of the aforementioned will range from about 20 to about 80% by weight and preferably about 30% to about 50% by weight.

In the practice of the method of the present invention, a reactor is changed first with water followed by the addition of effective amounts of citric acid or its alkali metal salt which is mixed and dissolved therein and thereafter the stannous ion releasing compound is added to the solution. These ingredients are mixed together at a temperature no higher than 160° F. and preferably about 100° to 120° F. and the pH is adjusted to between 1.5 and 7.0. The so prepared premix is then sealed in drums awaiting blending with the vehicle and other ingredients of the oral care composition.

In the preparation of an oral composition, the premix is mixed with a suitable oral composition vehicle to prepare a composition in which the stannous ion remains effectively stabilized and which composition will exhibit antiplaque and antigingivitis activity.

The vehicle ingredients used for the preparation of an oral composition to which the premix is added will normally include water, humectant, surfactant and polishing agent. The water and humectant comprise the liquid portion of the oral composition. The humectant component will preferably comprise a mixture of humectants, such as glycerin, sorbitol and a polyethylene glycol having a molecular weight in the range of 200–8000, but other mixtures of humectants and single humectants may also be employed.

The humectant content in the oral compositions is generally in the range about of 10% to about 80% by weight and preferably about 40 to about 50% by weight. The water content is in the range of about 3 to about 40% by weight and preferably 5 to 30% by weight.

Suitable stannous ion releasing compounds useful in the practice of the present invention include stannous fluoride and stannous chloride. Stannous fluoride is present in oral compositions prepared using the stable stannous ion premix solutions of the present invention at a concentration of about 0.05 to about 2% by weight and preferably about 0.2 to about 1% by weight.

When stannous chloride is present in the oral compositions of the present invention, the salt is present at a concentration of about 0.25 to about 5.0% by weight and preferably 0.5 to about 2% by weight.

A water soluble pyrophosphate salt may be used in the oral composition to impart antitartar activity thereto. Pyrophosphate salts can be any of the water soluble alkali metal pyrophosphates including dialkali metal pyrophosphates and tetraalkali metal pyrophosphates, such as disodium pyrophosphate, dipotassium pyrophosphate, tetrapotassium pyrophosphate and tetrasodium pyrophosphate. The amount of the pyrophosphate salt incorporated in the compositions of the present invention range from about 0.5 to about 5% by weight and preferably about 0.5 to about 2.0% by weight.

Inorganic thickeners may be incorporated in the compositions of the present invention, and especially useful in the practice of the present invention are silicas such as Sylox 15 available from W. R. Grace Corporation, that is, finely divided silica having a density of about 0.10–0.20 g/cc, an average particle size less than about 10 microns and preferably about 2 microns or less. The inorganic thickener is incorporated in the oral composition at a concentration of about 0.5 to about 10% by weight and preferably about 1 to about 5% by weight.

Organic thickeners of natural and synthetic gums as colloids may also be incorporated in the oral composition. Among these may be mentioned carrageenan (Irish moss), xanthan gum and carboxymethyl cellulose, which are preferred, and also starch, polyvinylpyrrolidone, hydroxyethylpropylcellulose, hydroxybutyl methyl cellulose, hydroxypropyl methyl cellulose, and combinations thereof. The organic thickener may be incorporated in the compositions of the present invention at a concentration of about 0.1 to about 3% by weight and preferably about 0.2 to about 2% by weight.

Surface active agents may be incorporated in the oral composition to provide foaming properties and also aid in producing a uniform composition in which the ingredients of the composition are evenly distributed. The surface-active material is preferably anionic, nonionic or ampholytic in nature, and most preferably is anionic. Suitable examples of anionic surfactants are higher alkyl sulfates such as potassium or sodium lauryl sulfate, sodium lauryl sulfoacetate, higher fatty acid monoglyceride monosulfates, such as the potassium salt of the monosulfated monoglyceride of hydrogenated coconut oil fatty acids, alkyl aryl sulfonates such as potassium dodecyl benzene sulfonate, higher fatty sulfoacetates, higher fatty acid esters of 1,2dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the potassium salts of N-lauroyl, N-myristoyl, or N-palmitoyl sarcosine.

Examples of water soluble nonionic surfactants are condensation products of ethylene oxide with various hydrogen-containing compounds that are reactive therewith and have long hydrophobic chains (e.g., aliphatic chains of about 12 to 20 carbon atoms), which condensation products ("ethoxamers") contain hydrophilic polyoxyethylene moieties, such as condensation products of poly (ethylene oxide) with fatty acids, fatty alcohols, fatty amides and other fatty moieties, and with propylene oxide and polypropylene oxides (e.g., Pluronic materials).

The surface active agent is generally present in the oral composition at a concentration of about 0.5 to about 5.0% by weight and preferably about 0.75 to about 2.0% by weight.

Abrasives may be incorporated in the oral composition and preferred abrasives are siliceous materials, such as silica, and preferably a precipitated amorphous hydrated silica, such as Zeodent 115, marketed by Huber Corporation, but other abrasives may also be employed, including water-insoluble sodium metaphosphate, potassium metaphosphate, anhydrous alumina trihydrate, aluminum silicate, zirconium silicate, calcined alumina and bentonite. The abrasive is generally present in the compositions of the present invention at a concentration of about 10 to about 40% by weight and preferably about 15 to about 30% by weight.

Other components which may be incorporated in the dentifrice of the present invention, include dyes, pigments, sweetener, flavor and preservative. In white dental cream formulations the pigment is preferably titanium dioxide, and the proportion thereof will normally be in the range of 0.2 to 3% by weight, preferably 0.5 to 1.0% by weight. The sweetener content will normally be that of an artificial or synthetic sweetener and the normal proportion thereof present will be in the range of 0.1 to 1.0% by weight, preferably 0.3 to 0.7% by weight. The flavor content, which is preferably of a mixed peppermint/menthol flavor, will usually be in the range of 0.5 to 2% by weight, preferably 0.5 to 1.5% by weight. F.D. & C grade dyes may be used in appropriate amounts to provide desired colors. The contents of other components or adjuvants of the toothpaste formula will normally not exceed 10% by weight, often will be less than 5% by weight, and can be as low as 0%. Examples of such adjuvants include antibacterial agents including halogenated diphenyl ethers such as Triclosan and chlorhexidene and potassium salts such as potassium nitrate and potassium titrate for the treatment of dentin hypersensitivity.

To prepare oral compositions such as dentifrices using the premix in accordance with the present invention, the premix prepared in accordance with the method of the present invention is dispersed in the vehicle ingredients water and humectant, along with an organic thickener, sweetener, pyrophosphate salt, dye or pigment in a conventional mixer until a slurry forms which is smooth in appearance. The mixture is heated to 100–120° F. for 10–30 minutes to produce a homogeneous gel phase. The gel phase is transferred to a vacuum mixer and inorganic thickener, abrasive, flavor and surfactant is added and mixed for 10–30 minutes at high speed under vacuum in the range of 5 to 100 millimeter of mercury pressure, (mm Hg) preferably 5 to 50 mm Hg to provide a homogenous paste. The resultant product is a stable dentifrice having a toothpaste or gel texture having a pH in the range of 3 to 7, preferably 4.5 to 6.5, and of satisfactory flavor.

As to other embodiments of the invention, oral care compositions of the present invention may be made in substantially the same manner, with normal adjustments of the formula components and proportions known to those of skill in the oral care formulation art. To make mouthwashes or other liquid preparations, the main active ingredients may be dissolved or dispersed in an appropriate liquid medium, usually an aqueous alcoholic medium, and insoluble materials will normally be omitted. Other types of oral compositions and preparations may be prepared by appropriate conventional procedures, with appropriate additions of the usual active ingredients and of the appropriate usual supplements and adjuvants during the manufacturing process.

The following examples are further illustrative of the present invention, but it is understood that the invention is not limited thereto. All amounts and proportions referred to herein and the appended claims are by weight.

Example I.

A premix containing the ingredients listed in Table I was prepared by dissolving stannous fluoride and stannous chloride dihydrate in water heated to 120–160° F. containing either citric acid or sodium citrate. The solutions designated Compositions A and B respectively were cooled to room temperature and then observed for the appearance of a precipitate over a period of three hours. The appearance of a precipitate was indicative of instability of the stannous compounds originally dissolved in the solution. The observed results are recorded in Table I below.

For purposes of comparison the procedure of Example I was repeated except that either no acidic ingredient was present in the aqueous premix solution or an ingredient other than citric acid or sodium citrate was substituted for citric acid or sodium citrate. The ingredients of these comparative solutions designated Compositions C, D, E, F and G and their stability are also recorded in Table I.

TABLE I

| Ingredients | Premix Solution Composition | | | | | | |
|---|---|---|---|---|---|---|---|
|  | A | B | C | D | E | F | G |
| Water | 40.00* | 40.00 | 40.00 | 40.00 | 40.00 | 40.00 | 40.00 |
| Stannous Fluoride | 3.656 | 3.656 | 3.656 | 3.656 | 3.656 | 3.656 | 3.656 |
| Stannous Chloride.$_2$H$_2$O | 12.00 | 12.00 | 12.00 | 12.00 | 12.00 | 12.00 | 12.00 |
| Acidic Ingredient |  |  |  |  |  |  |  |
| Citric Acid Anhydrous | 8.80 |  |  |  |  |  |  |
| Trisodium Citrate Dihydrate |  | 8.80 |  |  |  |  |  |
| Sodium Acid Pyrophosphate |  |  | 8.80 |  |  |  |  |
| Polyacrylic Acid |  |  |  | 6.0 |  |  |  |
| Acetic Acid |  |  |  |  | 8.0 |  |  |
| Gantrez S97 Acid Form** |  |  |  |  |  | 4.0 |  |
| None |  |  |  |  |  |  | 0.00 |
| pH | 1.70 | 6.9 | 5.70 | 4.4 | 4.8 | 4.9 | 5.4 |
| Results | Clear | sl. ppt.*** | ppt.*** | ppt. | ppt. | ppt. | ppt. |

*Compositions expressed in grams
**Poly (vinyl methyl ether/maleic anhydride)
***ppt. = precipitate observed, sl. ppt. = slight amount of precipitate observed The results recorded in Table I indicate that only aqueous premix solutions of stannous fluoride and stannous chloride containing 8% by weight citric acid or sodium citrate (Compositions A and B) exhibited acceptable stability. Unacceptable precipitation formation was observed in Premix Solutions C-G.

Example II

A series of toothpastes designated toothpastes H, I, J and K was prepared using a premix prepared in accordance with Example I and following the procedure for toothpaste preparation previously described. The compositions of these toothpastes are recorded in Table II below.

An aqueous oral care composition containing a stannous ion releasing compound which is "effectively stabilized" means that the stannous ion concentration in the composition after 12 weeks storage at 105° F. remains at an acceptable therapeutic level, i.e., the stannous ion concentration remaining in the oral care composition after such storage conditions is equivalent to about 70 percent or more of the original concentration of stannous ion at the time of formulation of the composition. Product stability after 12 weeks at 105° C. is comparable to product stability after 2-3 years at room temperature.

To determine the stability of the toothpastes of Example II, the toothpastes as prepared were analyzed to determine the amount of stannous ion present. This analysis is recorded in Table II. The toothpastes were then stored in plastic laminated tubes and heated in air for 12 weeks at 105° F. Analysis of stannous ion present in the toothpastes after the twelve week storage period was made and is also recorded in Table II.

For purposes of comparison, the procedure was repeated except that citric acid was not included in the premix but was added to the toothpaste vehicle. The ingredients of this comparative composition designated Composition L and the stannous ion analysis results are also recorded in Table II below.

TABLE II

| INGREDIENTS | Toothpaste Compositions | | | | |
|---|---|---|---|---|---|
| | H | I | J | K | L |
| PREMIX* | | | | | |
| Deionized Water | 7.5** | 7.5 | 7.5 | 7.5 | 5.0 |
| Citric Acid Anhydrous | 1.1 | 1.1 | 0.6 | 0.6 | 0 |
| Stannous Fluoride | 0.454 | 0.454 | 0.454 | 0.454 | 0.454 |
| Stannous Chloride.$_2$H$_2$O | 1.5 | 1.5 | 1.5 | 1.5 | 1.5 |
| TOOTHPASTE | | | | | |
| Glycerin | 25.346 | 25.346 | 25.346 | 25.346 | 25.346 |
| Carboxy Methyl Cellulose | 0.6 | 0.6 | 0.6 | 0.6 | 0.6 |
| Sodium Saccharin | 0.3 | 0.3 | 0.3 | 0.3 | 0.3 |
| Titanium Dioxide | 0.5 | 0.5 | 0.5 | 0.5 | 0.5 |
| Tetrasodium Pyrophosphate | 2.0 | 2.0 | 2.0 | 2.0 | 2.0 |
| Sodium Tripolyphosphate | 3.0 | 0 | 0 | 3.0 | 3.0 |
| Trisodium Citrate Dihydrate | 0 | 3.0 | 3.0 | 0 | 0 |
| Sorbitol | 20.0 | 20.0 | 20.0 | 20.0 | 20.0 |
| Deionized Water | 10.5 | 10.5 | 10.5 | 10.5 | 13.0 |
| Citric Acid | 0 | 0 | 0 | 0 | 1.1 |
| Zeodent 115 | 22.0 | 24.0 | 22.0 | 24.0 | 22.0 |
| Sylox 15 | 3.0 | 0 | 3.0 | 0 | 3.0 |
| Flavor | 1.0 | 1.0 | 1.0 | 1.0 | 1.0 |
| Sodium Lauryl Sulfate | 1.2 | 1.2 | 1.2 | 1.2 | 1.2 |
| Initial % Sn++ | 1.10 | 1.02 | 0.997 | 1.0 | 0.6 |
| % Sn++ @ 4 wks 105° F. | 1.01 | 1.0 | 0.967 | 0.98 | 0.4 |
| % Sn++ @ 12 wks 105° F. | 0.97 | 0.82 | — | — | — |
| pH (as is) | . | 5.2 | 5.5 | 5.4 | 5.3 | 5.2 |

*Ingredients in toothpaste as sourced from premix.
**Compositions expressed in % by weight.

The results recorded in Table II indicate that during the 4 to 12 week storage at 105° F. that there was substantially no stannous ion loss in Compositions H-K whereas there was over a 30% reduction in stannous ion concentration in the comparative toothpaste Composition L after 4 weeks storage at 105° F.

What is claimed is:

1. A method for the preparation of an aqueous oral care composition containing a stable stannous ion releasing compound which comprises first dissolving the stannous compound in an aqueous solution of citric acid or its alkali metal salt to prepare a premix and then adding the premix to the vehicle of the oral care composition.

2. The method of claim 1 wherein the stannous ion releasing compound is present in the premix at a concentration of about 2 to about 25% by weight.

3. The method of claim 1 wherein the stannous ion releasing compound is stannous fluoride.

4. The method of claim 3 wherein the stannous fluoride is present in the oral care composition at a concentration of about 0.05 to about 3% by weight.

5. The method of claim 1 wherein the stannous compound is stannous chloride.

6. The method of claim 5 wherein the stannous chloride is present in the oral care composition at a concentration of about 0.25 to about 5% by weight.

7. The method of claim 1 wherein the alkali metal salt is sodium citrate.

8. The method of claim 1 wherein the citric acid or alkali metal salt thereof is present in the premix at a concentration of about 1 to about 15% by weight.

9. The method of claim 1 wherein the citric acid or the alkali metal salt thereof is present in the composition at a concentration of about 1 to about 5% by weight.

10. The method of claim 1 wherein the premix solution has a pH between about 1.5 to about 7.0.

11. The method of claim 1 wherein the premix solution has a pH between about 1.5 and about 2.5.

* * * * *